United States Patent [19]

Takahashi et al.

[11] Patent Number: 4,871,011

[45] Date of Patent: Oct. 3, 1989

[54] AIR-CONDITIONING EQUIPMENT FOR VEHICLE

[75] Inventors: Tadahiro Takahashi; Shinichi Ooi; Masami Takemasa, all of Saitama, Japan

[73] Assignee: Diesel Kiki K.K., Tokyo, Japan

[21] Appl. No.: 180,566

[22] Filed: May 24, 1988

[30] Foreign Application Priority Data

Mar. 12, 1986 [JP] Japan .................. 61-53886
Mar. 28, 1986 [JP] Japan .................. 61-70016

[51] Int. Cl.$^4$ .............. F25B 29/00; B60H 1/00; G05D 23/24
[52] U.S. Cl. .................. 165/16; 165/24; 165/43; 98/2.01; 98/2.06; 98/2.11; 236/49.3; 318/15; 318/641; 318/666; 62/228.5; 62/323.4
[58] Field of Search ............ 165/16, 24, 25, 42, 165/43, 40; 62/228.5, 323.4; 98/2.01, 2.06, 2.11; 236/49; 318/15, 641, 666

[56] References Cited

U.S. PATENT DOCUMENTS

| | | | |
|---|---|---|---|
| 3,934,642 | 1/1976 | Coulson et al. | 165/43 |
| 3,948,312 | 4/1976 | Nisbet | 165/16 |
| 4,070,610 | 1/1978 | Rudich, Jr. | 318/641 |
| 4,289,195 | 9/1981 | Bellot et al. | 165/16 |
| 4,352,452 | 10/1982 | Shimada et al. | 165/24 |
| 4,418,743 | 12/1983 | Dietzsch et al. | 165/43 |
| 4,442,885 | 4/1984 | Matsuzaki | 165/25 |
| 4,566,528 | 1/1986 | Helmle et al. | 165/43 |
| 4,580,620 | 4/1986 | Fukumoto et al. | 165/40 |
| 4,616,164 | 10/1986 | Kenny et al. | 318/666 |

FOREIGN PATENT DOCUMENTS 2477736 9/1981 France .................. 98/2.01

Primary Examiner—John Ford
Attorney, Agent, or Firm—Kanesaka & Takeuchi

[57] ABSTRACT

An air-conditioning equipment for a vehicle includes first and second local shutter control units each having a motor for moving a shutter, a drive circuit for driving the motor, a controlling device responsive to a heat load signal to control the drive circuit to thereby control the shutter in accordance with the heat load signal, and a blower control unit responsive to changes in opening of the shutter to control the rate of an air flow. Since separate shutter control units are provided, each shutter can be controlled independently, thus preventing all the air-conditioning functions from halting simutaneously otherwise occurred in conventional air-conditioning equipment having a central control unit or microcomputer.

2 Claims, 17 Drawing Sheets heat load signal F →

AIR-CONDITIONING EQUIPMENT FOR VEHICLE

CROSS-REFERENCES TO RELATED APPLICATIONS

This application is a continuation of Ser. No. 022,984 filed Mar. 6, 1987, now abandoned.

BACKGROUND OF THE INVENTION

The present invention relates to air-conditioning equipment for a vehicle and more particularly to air-conditioning equipment provided with an improved drive unit for driving the actuators.

Conventionally, air-conditioning equipment for a vehicle, such as shown in FIG. 10 and disclosed by Japanese Patent Kokai No. 58-209609, consists of an outside air/inside air changing shutter 2 mounted in a duct 1, a blower 3, an evaporator 4, an air mixing shutter 5, a heater 6, a mode selecting shutter 7, a defrost side outlet 9, a face side outlet 8, and a foot side outlet 10. The evaporator 4 consititutes a cooling system together with a compressor 11, a condensor 12, a receiver tank 13, and an expansion valve 14. The rotation of an engine 15 is transmitted to the compressor 11 through a magnet clutch 16.

An A/D converter 17 converts respective analog signals of the inside temperature Tr sensed by an inside air sensor 18 mounted inside the vehicle compartment, the opening $\theta$ of the air mixing shutter 5 detected by a position detecting potentionmeter 19, the sunlight temperature Ts detected by a sunlight sensor 20, the outside or ambient temperature Ta detected by an outside temperature sensor 21, the duct temperature Tm detected by a mode sensor 22 mounted in the duct 1, the set or desired temperature Td supplied from a temperature setting unit 23, and the water temperature Tw supplied from a water temperature switch 90 into the corresponding digital signals and feeds these resultant digital signals to a control unit 24.

The control unit 24 consists of a microcomputer which includes a changing shutter controlling section 27 for controlling the outside air/inside air changing shutter 2 through a switching circuit 25 and an actuator 26, a compressor controlling section 29 for controlling the magnet clutch 16 through drive circuit 28, a blower controlling section 31 for controlling the blower 3 through a drive circuit 65, an air mixing shutter controlling section 34 for controlling the air mixing shutter 5 through a drive circuit 60 and an actuator 50, a mode selecting shutter controlling section 37 for controlling the mode selector shutter 7 through a switching circuit 35 and an actuator 36, and an arithmetic and logical unit 38 which performs arithmetic operations on each of the temperatures Tr, Ts, Ta, Tm, and Td, and sends out the results to the respective controlling sections 27, 29, 31, 34, and 37. A manual switch 39 is provided for manually controlling the blower 3.

The compressor controlling section 29 is provided for keeping the temperature of the evaporator 4 constant by turning the compressor 11 off when the duct temperature Tm goes down to a lower limit (stored in a setting unit 41) that is somewhat higher than the temperature at which the evaporator 4 is frozen and on when the duct temperature Tm goes up to an upper limit (stored in a setting unit 40) that is higher than the above freezing point by the gap of a hysteresis curve. As described above, the arithmetic and logic unit 38 performs arithmetic operations on each of the temperatures Tr, Ts, Ta, Tm, and Td and sends out the resultant signal or heat load signal to the changing shutter controlling section 27, the compressor controlling section 29, the blower controlling section 31, the air mixing shutter controlling section 34, and the mode selecting shutter controlling section 37. Each of the above control sections controls the changing circuit 25 or 35, or the drive circuits 28, 65 or 60.

The respective actuators 26, 50, and 36 are driven to control the changing shutter 2, the air mixing shutter 5, and the mode selecting shutter 7 in accordance with the characteristics shown in FIGS. 11(a), 11(b), 11(c), and 11(d), while the blower 3 and the compressor 11 are controlled in accordance with the characteristic curve shown in FIG. 11(e).

The heat load signal F is given by the following formula:

$$F=(A.Tr+B.Ts+C.Tm)-Td$$

wherein A, B and C are constants.

When the heat load signal F decreases to a certain point along the characteristic line shown in FIG. 11(a), the changing shutter 2 is turned from the outside air intake mode to the inside air intake mode as shown in FIG. 11(b). As the heat load signal F decreases, the opening $\theta$ of the air mixing shutter 5 also decreases as shown in FIG. 11(c) to increase the mixing ratio of cool air. The mode selecting shutter 7 is switched from the foot side output mode to the face side output mode through the bi-level mode as shown in FIG. 11(d). As the heat load signal F decreases, the blower speed first decreases toward a low speed limit, stays at the low speed level for a while and then increases toward a high speed limit as shown in FIG. 11(e).

The control unit or microcomputer 24 incorporates various controlling devices, such as the changing shutter controlling section 27, the air mixing shutter controlling section 34, the mode selecting shutter controlling section 37, so that it is complicated and expensive to construct. In addition, it is troublesome and expensive to replace any of the actuators 26, 36, and 50, with another actuator of a different capacity or type because the control unit itself must be replaced. Moreover, there is a danger that all the actuators stop working when the central control unit 24 becomes out of order.

SUMMARY OF THE INVENTION

Accordingly, it is an object of the present invention to reduce the cost required for installing an additional actuator or replacing a given actuator already installed.

It is another object of the invention to prevent the air-conditioning equipment from stopping all its functions when an actuator or actuators become out of order.

It is a still another object of the invention to simplify the wiring operation by making the structure of a drive unit simple.

These and other objects and many of the attendant advantages of this invention will be readily appreciated as the invention becomes better understood from the following detailed description when taken in conjunction with the accompanying drawings.

DESCRIPTION OF THE PREFERRED EMBODIMENTS

Figure 10:
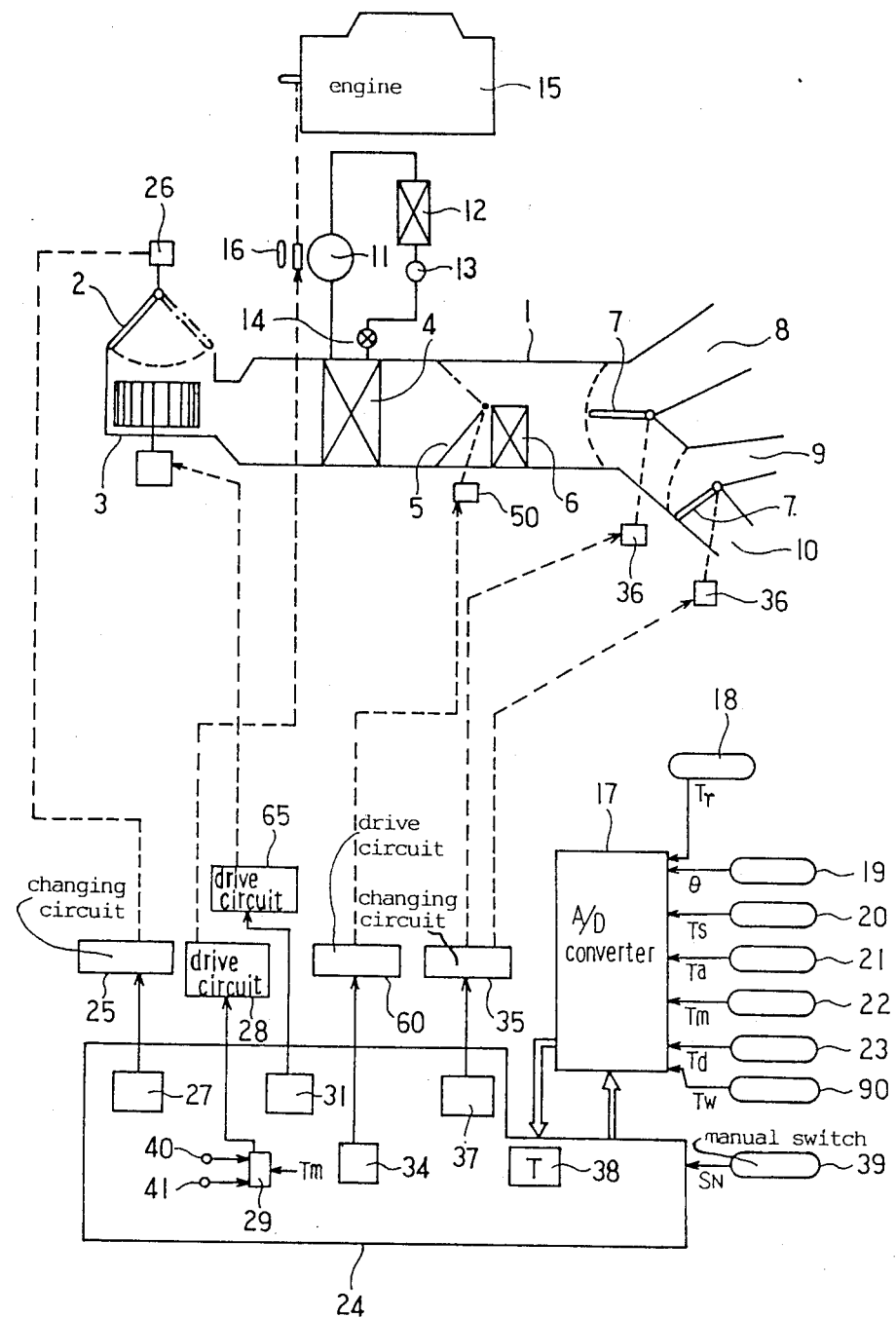
FIG. 10 is a block diagram of air-conditioning equipment for a vehicle according to the prior art.

In FIG. 1(a) there is shown air-conditioning equipment for a vehicle, in which like reference numerals indicate the same or equivalent members as shown in FIG. 10. The air-conditioning equipment includes an actuator 26 for controlling an outside air/inside air changing shutter 2, an actuator 36 for controlling a mode selecting shutter 7, and an actuator 50 for controlling an air mixing shutter 5. The actuator 26 for the air changing shutter 2 consists of a motor 26M, a position sensor 26A, such as a potentiometer, a drive circuit 25A, a controlling device or a comparator 27A, and a case 26T for housing these motor, position sensor, drive circuit, and the controlling device.

As FIG. 1(b) shows, the motor 26M is connected to an output shaft W through a gear train J. The position sensor 26A detects the rotary position of the motor 26M. The drive circuit 25A drives the motor 26M so as to make the output of the position sensor 26A equal to the input signal Vin of the comparator 27A. The other actuators 36 and 50 are similar to the actuator 26 and, therefore, their detailed description will be omitted.

Figure 11:
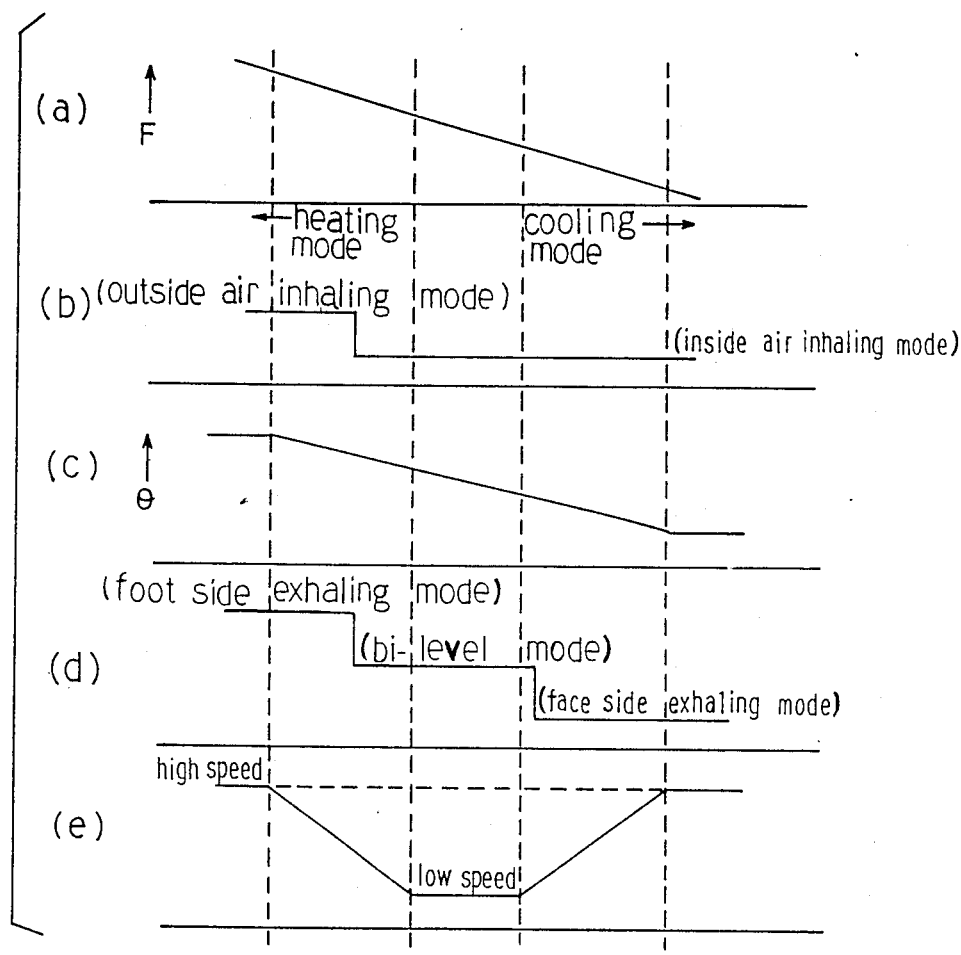
FIG. 11 is a graph showing the control characteristics of each shutter, the blower and the compressor of FIG. 10.

When the motor 26M is turned on, it rotates through the gear train J the output shaft W to control the position of the shutter 2 through a link (not shown) in accordance with the characteristic shown in FIG. 11(b). Similarly, the positions of the air mixing shutter 5 and the mode selecting shutter 7 are controlled according to the respective characteristics shown in FIGS. 11(c) and 11(d).

Figure 1:
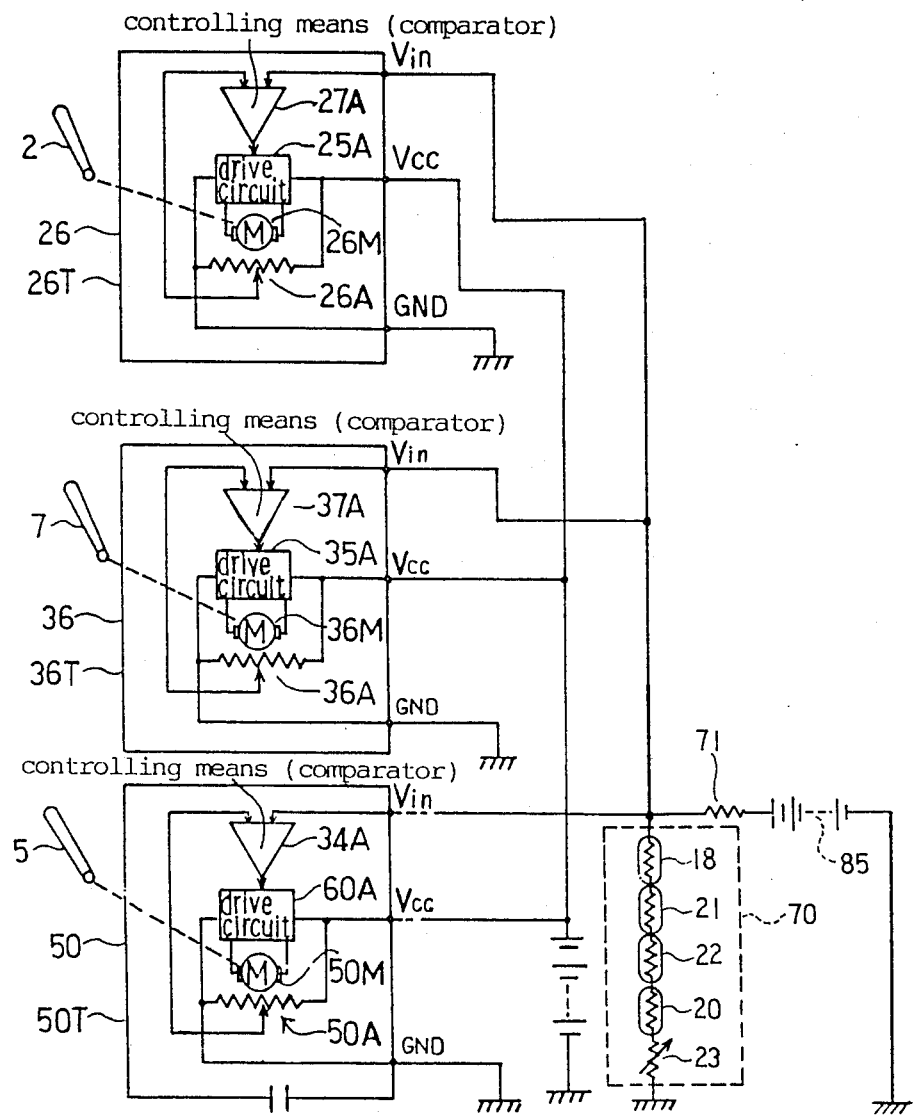
FIG. 1(a) is a block diagram of air-conditioning equipment for a vehicle according to an embodiment of the present invention.
FIG. 1(b) is a front view of an actuator of the air-conditioning equipment of FIG. 1(a), which includes a controlling device, a motor, and a drive circuit.
FIG. 1(c) is a circuit diagram showing an example of the drive circuit of FIG. 1(b)
Figure 1:
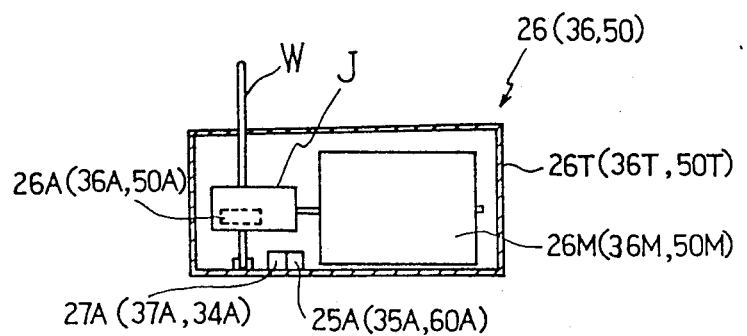

In FIG. 1 there is also shown a heat load detecting device 70 for producing an analog heat load signal F, which consists of a series circuit of an inside air sensor 18, a sunlight sensor 20, an outside air sensor 21, a mode sensor 22, and a temperature setting device 23. One end of the series circuit is connected to a power source 85 through a resistor 71. The junction between the series circuit 70 and the resistor 71 is connected to input terminals Vin of the respective actuators 26, 36, and 50.

When the heat load detecting device 70 detects various temperatures, such as the desired temperature Td, the compartment temperature Tr and the ambient temperature Ta, and sends out an input signal Vin to the respective comparators 27A, 37A, and 34A, which compare the input signal Vin with the position signals detected by the respective position detecting devices 26A, 36A and 50A and send out the resulting signals to the respective drive circuits 25A, 35A, and 60A. The driving circuits 25A, 35a, and 60A then drive the respective motors 26M, 36M, and 50M in accordance with the resulting signals from the controlling devices or comparators 27A, 37A, and 34A. When the output signals from the position detecting devices 26A, 36A, and 50A become equal to the input signal Vin from the heat load detecting device 70, the respective motors 26M, 36M, and 50M are brought to a stop.

Figure 1C:
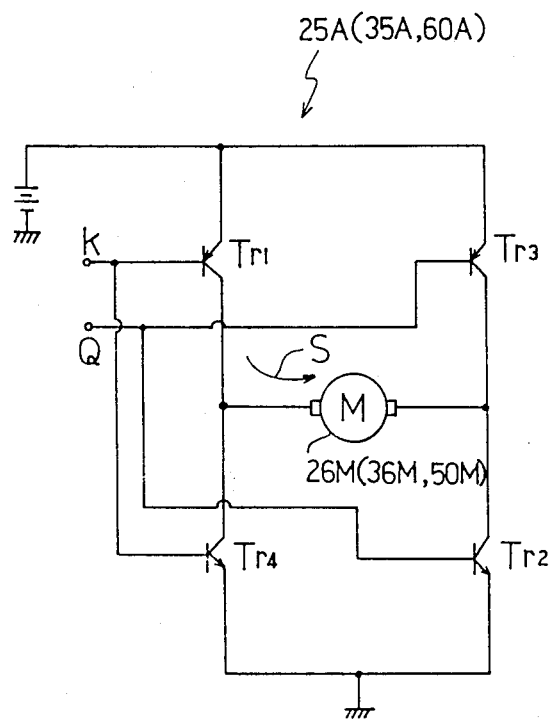

As FIG. 1(c) shows, the drive circuit 25A is a well-known circuit consisting of four transistors Tr1–Tr4 connected in a bridge configuration, and the motor 26M is connected to the drive circuit. When a low-level signal is fed to the terminal K and a high-level signal is fed to the terminal Q, the transistors Tr1 and Tr2 are turned on while the transistors Tr1 and Tr2 are turned off to flow current through the motor 26M in the clockwise direction shown by an arrow S, turning the motor in the clockwise direction. When a high-level signal is fed to the terminal K and a low-level signal is fed to the terminal Q, the motor is turned in the counterclockwise direction. The other drive circuits 35A and 60A are similar to this drive circuit 25A and, therefore, their description will be omitted.

When low-level signals are fed to the terminals K and Q, the transistors Tr1 and Tr3 are turned on but the transistors Tr3 and Tr4 are turned off, bringing the motor to a stop. The controlling device 27A, 37A or 34A is constructed with a well-known comparator so as to control the drive circuit 25A, 35A or 60A in accordance with the characteristics shown in FIGS. 11(b), (d), and (c).

Figure 2A:
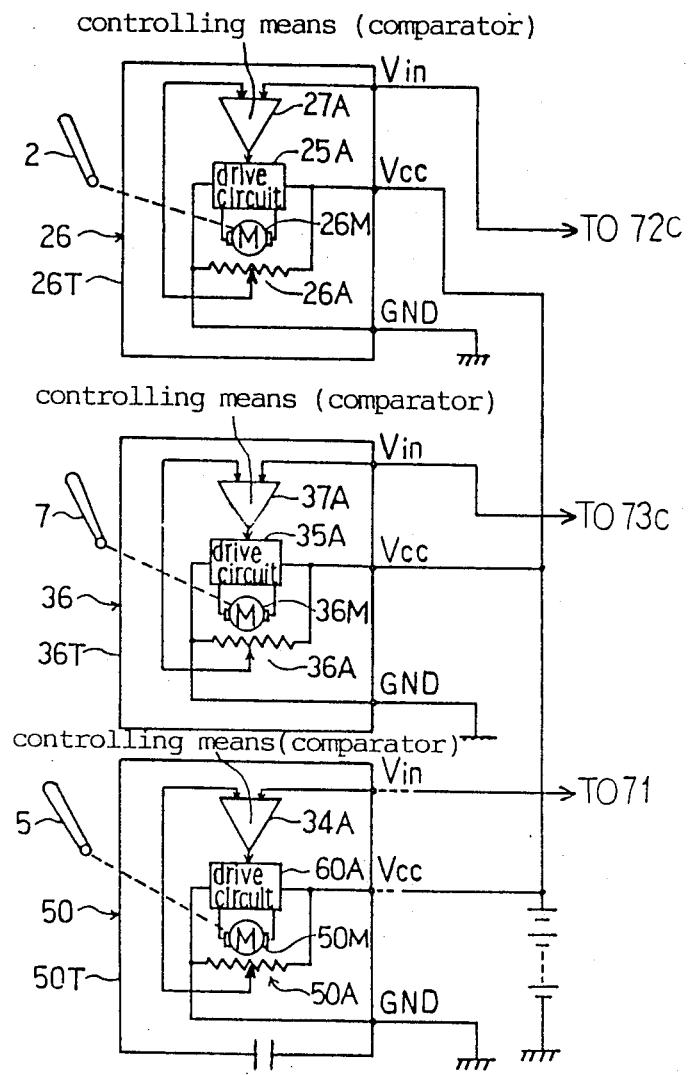
FIGS. 2(a) and 2(b) are block diagrams of another embodiment provided with mannual setting units according to the present invention.
Figure 2B:
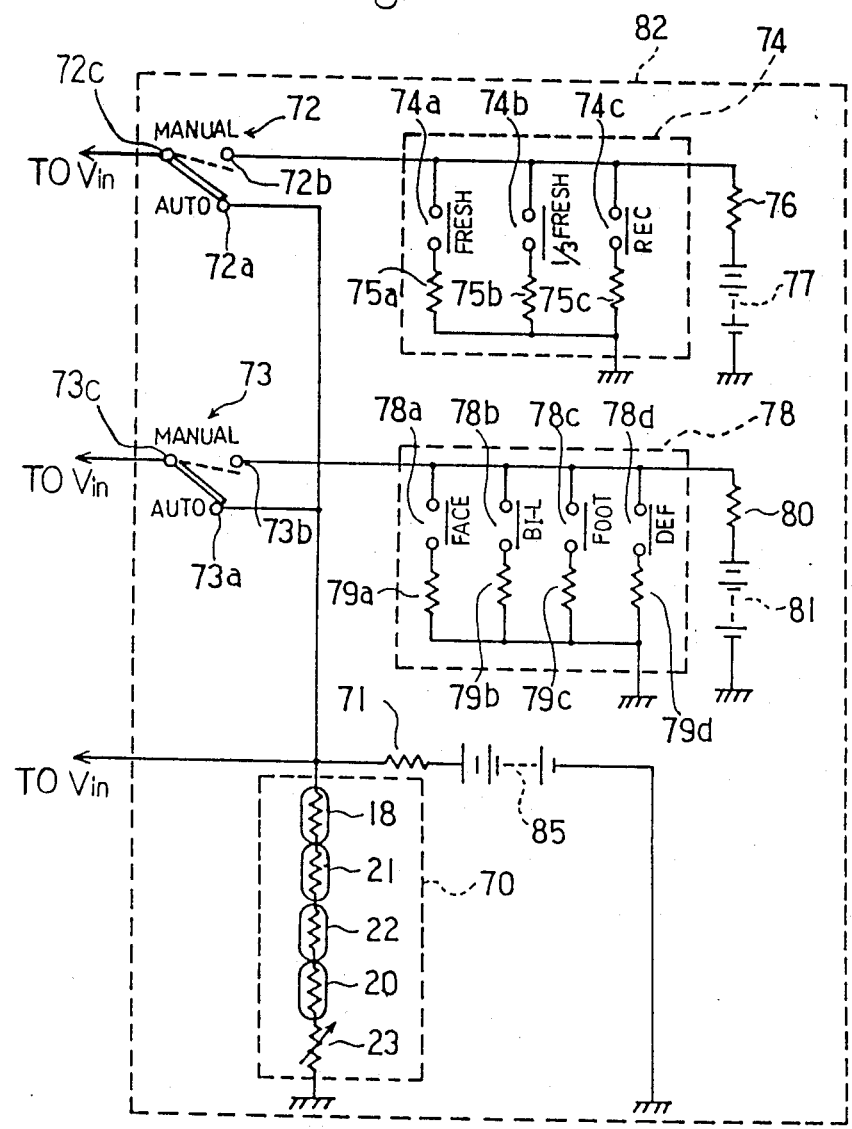

FIGS. 2(a) and 2(b) show another embodiment of the invention, which is provided with a control signal output unit 82 having two manual setting devices 74 and 78. A manual setting device 74 for controlling the changing shutter 2 consists of an outside or fresh air intake switch 74a, a ½ outside air intake switch 74b, and an inside air intake or recirculation switch 74c. One end of each of the switches is grounded through each resistor 75a, 75b, or 75c and the other end is connected to a power source 77 through a resistor 76. The Manual contact 72b of a manual switch or change-over switch 72 is connected to the junction between the manual setting device 74 and the resistor 76.

A manual setting device 78 for controlling the mode selecting shutter 7 consists of a face mode set switch 78a, a bi-level mode set switch 78b, a foot mode set switch 78c, and a defrost mode set switch 78d. One end of each of the switches is grounded through each of resistors 79a–79d and the other end is connected to a power source 81 through a resistor 80. The manual set contract 73b of a manual set switch or change-over switch 73 is connected to the junction between the manual setting device 78 and the resistor 80. The manual setting devices 74 and 78 and the heat load detecting device 70 constitute a control signal output unit 82.

When the movable contacts 72c and 73c of the manual set switches 72 and 73 are connected to the manual set contacts 72b and 73b, respectively, the controlling units 27A, 34A, and 37A are supplied with the respective manual signals, as external input signals Vin, while when the movable contacts 72c and 73c of the manual set switches 72 and 73 are connected to the automatic set contacts 72a and 73a, respectively, the controlling units 27A, 34A, and 37A are supplied with the heat load signal as an external input signal Vin. Thus, the driver or passengers may choose either manual or automatic control for controlling the air-conditioning equipment.

Figure 3:
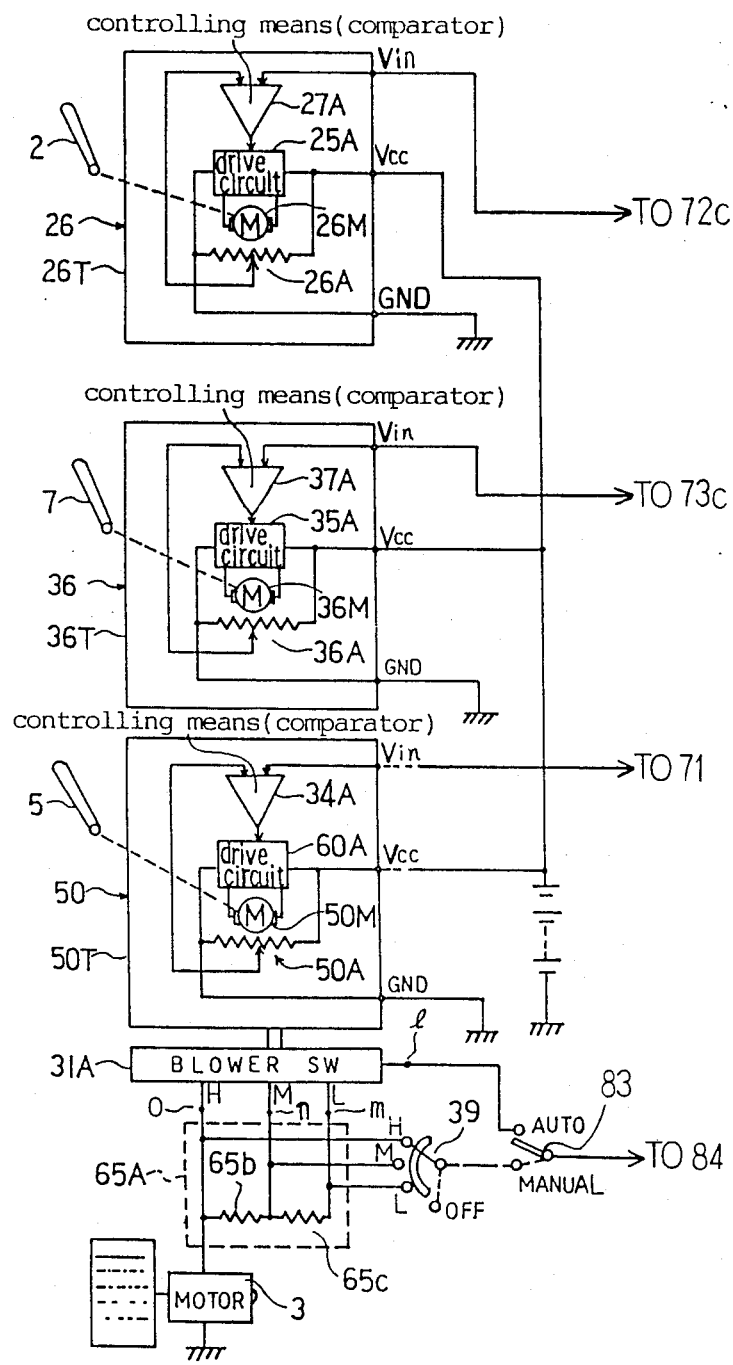
FIGS. 3(a) and 3(b) are block diagrams of a still another embodiment provided with a blower controlling device according to the present invention.
FIG. 3(c) is an exploded perspective view of the blower controlling device of FIGS. 3(a) and 3(b)
Figure 3B:
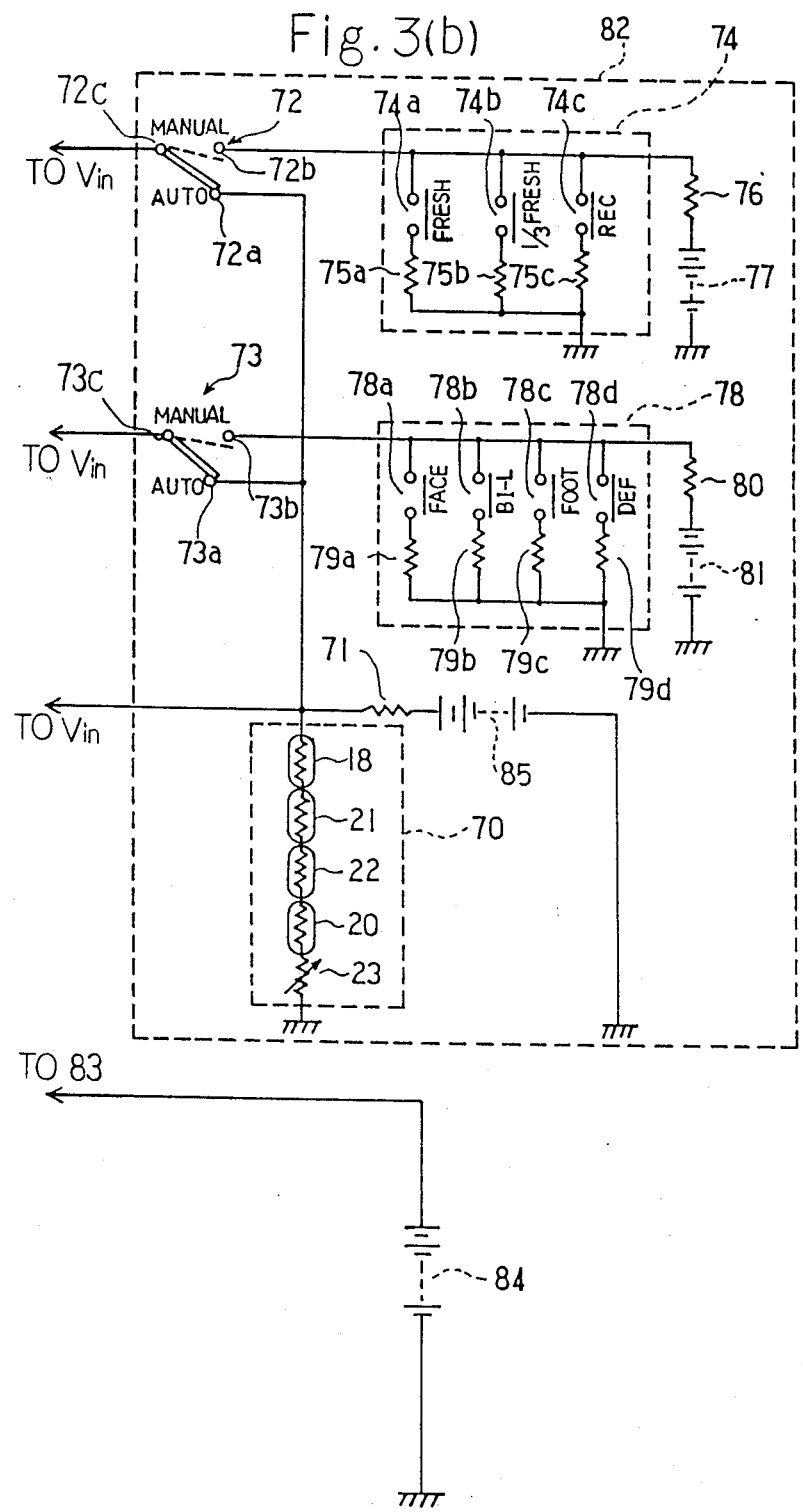
Figure 3:
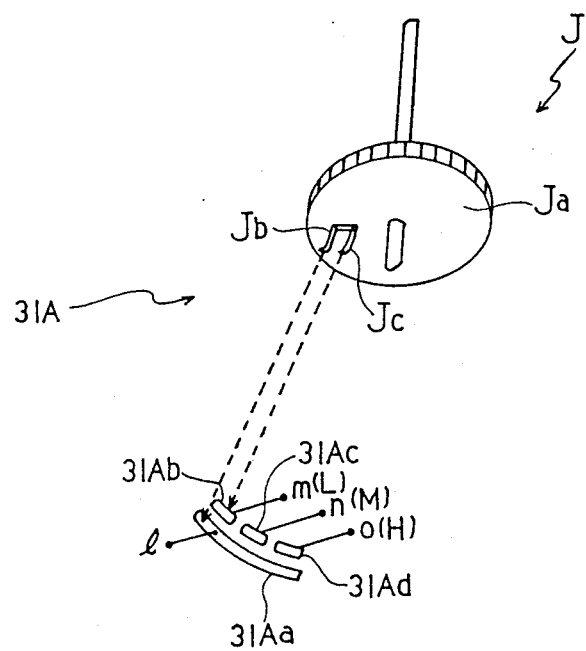

FIGS. 3(a) and 3(b) show still another embodiment of air-conditioning equipment, which is provided with a blower control device in addition to the control signal output unit 82. The blower controlling device 31A controls the drive circuit 65A in cooperation with the actuator 50 to change the blower speed from High to Middle, Middle to Low, Low to Middle, and Middle to High as the air mixing shutter 5 is turned from the cooling mode to the full heating mode.

As FIG. 3(c) shows, the blower controlling device 31A is constructed in such a manner that the two conductive legs Jb and Jc of a U-shaped member mounted on the back of a gear wheel Ja of the gear train J of FIG. 1(b) is brought into contact with a common contact 31Aa and a low speed contact 31Ab, a middle speed contact 31Ac, or a high speed contact 31Ad mounted on a side of the case 26T, respectively. As the gear wheel Ja rotates, the conductive leg Jc is brought into contact with the low speed contact 31Ab, middle speed contact 31Ac, and high speed contact 31Ad so that the terminal 1 is connected to the terminal m (L), n (M), or o (H) through the conductive legs Jb and Jc.

Figure 4A:
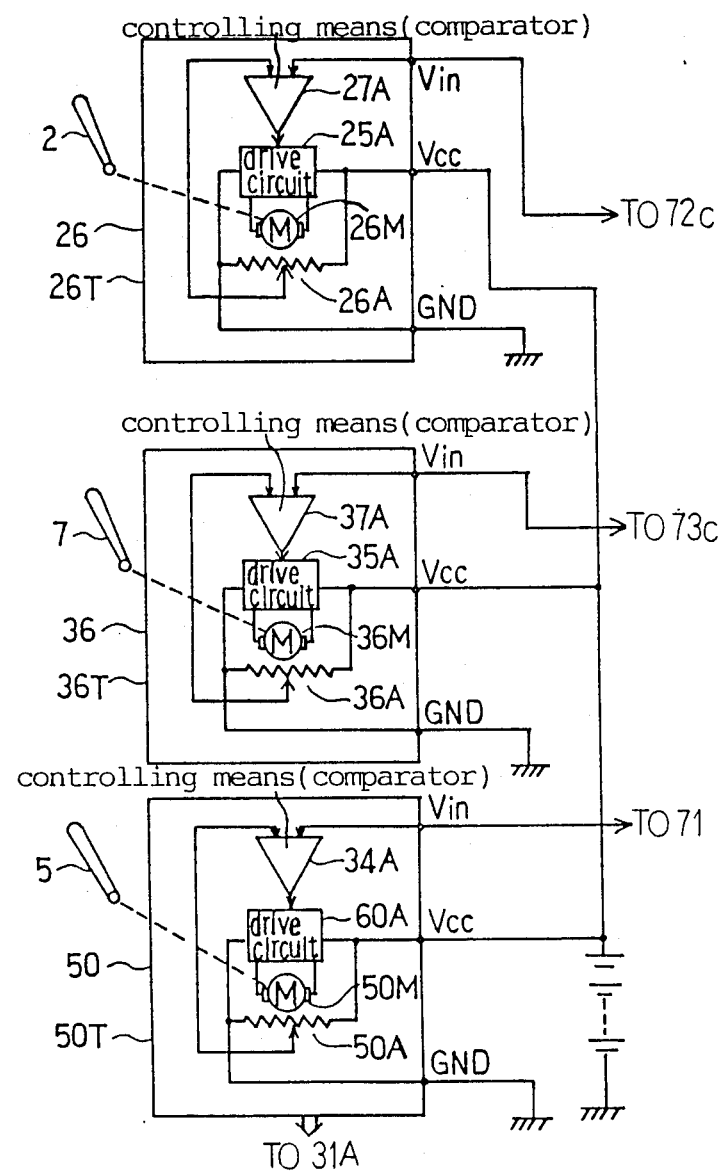
FIGS. 4(a)–4(c) are block diagrams block diagram of a yet another embodiment provided with a compressor controlling device according to the present invention.
Figure 4B:
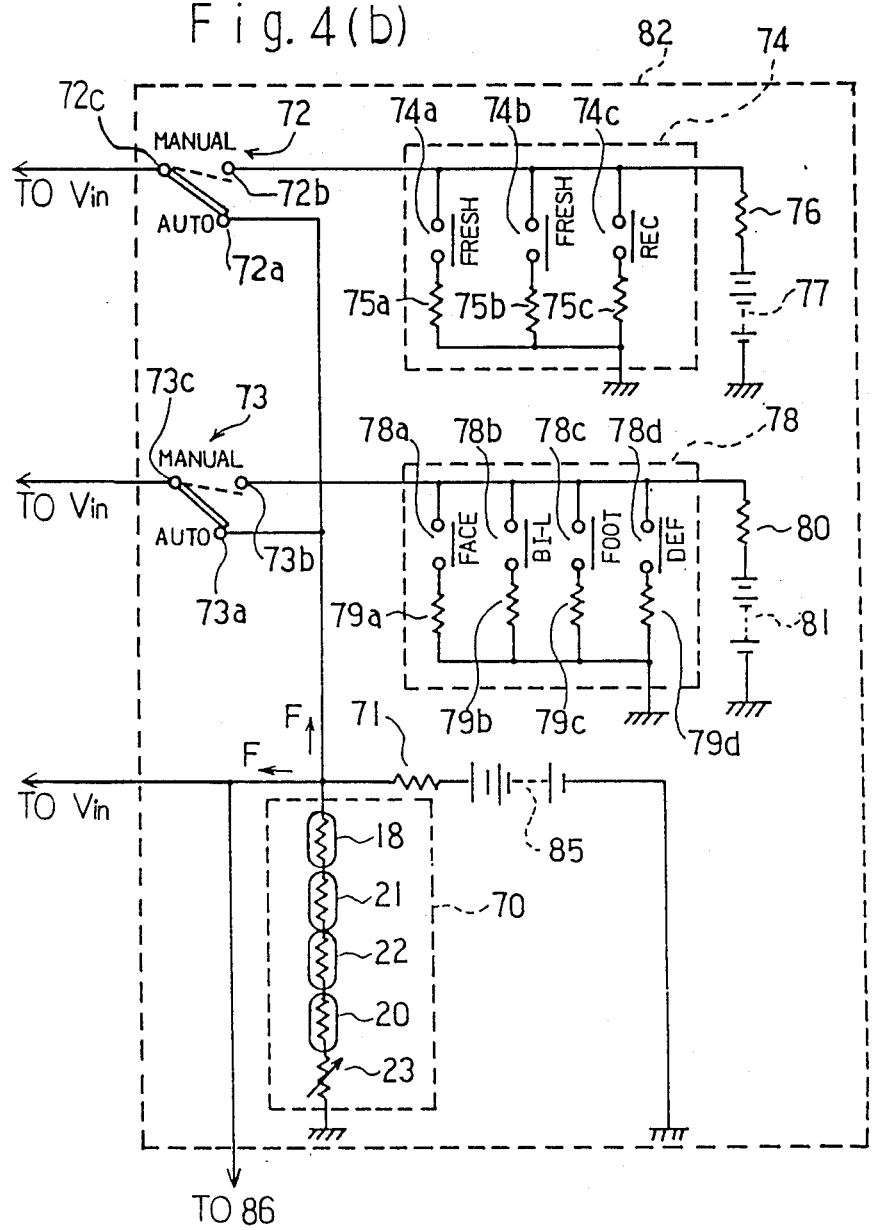
Figure 4C:
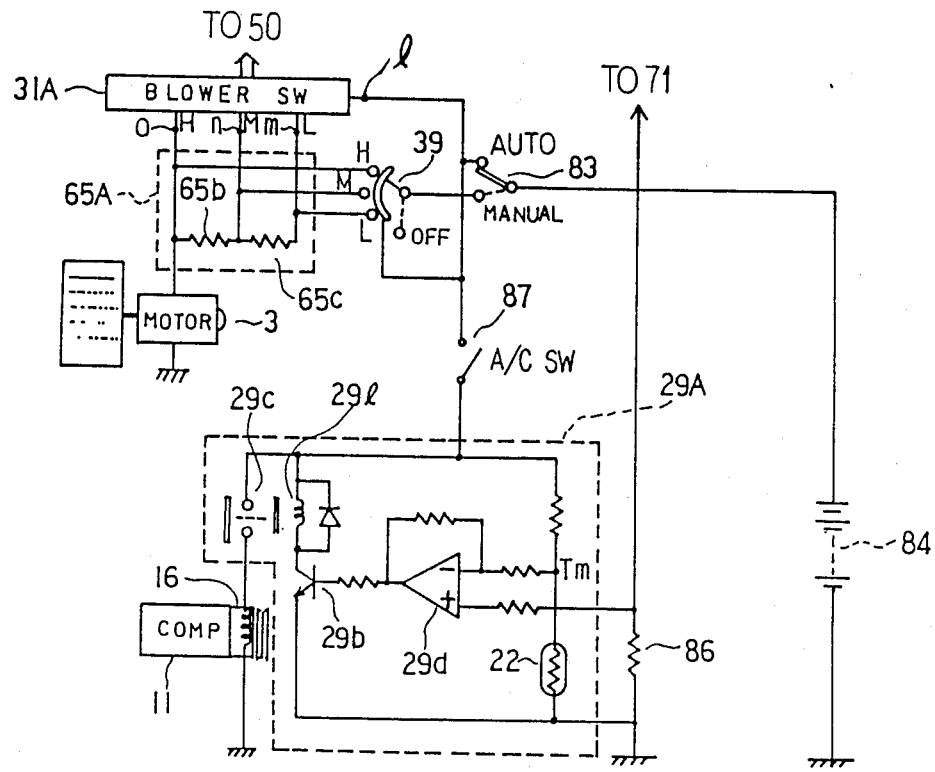

In FIGS. 4(a) through 4(c) the drive circuit 65A consists of resistors 65b and 65c connected between the motor 3 and the power source 84 through the blower controlling device 31A or the blower speed setting unit 39 depending on the position of a manual switch 83.

When the manual switch 83 is turned to the Auto side to connect the power source to the terminal 1 of the blower controlling device 31A, the power is applied to the terminal m, n, or o depending on the position of the air mixing shutter 5 or the gear wheel Ja, thus setting the blower 3 at either low, middle, or high speed. Namely, the blower speed is changed along the characteristic line shown in FIG. 11(e) as the opening of the air mixing shutter 5 is changed along the line of FIG. 11(c).

When the manual switch 83 is turned to the Manual side to connect the power source to the blower speed setting unit 39, the blower maintains the set speed regardless of the opening of the air mixing shutter 5.

In FIG. 4(c) the air conditioning equipment is also provided with a compressor controlling device. A compressor controlling device 29A consists of a comparator 29d to compare the temperature sensed by the mode sensor 22 on the evaporator with the temperature level determined by a resistor 86 to turn a transistor 29b on or off thereby to close or open the contact 29c of a relay 29l, thus controlling the compressor 11. The power is supplied to the compressor controlling device 29A through the manual switch 83, the blower speed setting unit 39, and an air-conditioner switch 87.

The resistor 86 is connected to the output of the heat load detecting device 70. When the air conditioner switch 87 is turned on, the compressor 11 is driven so as to keep the temperature of the evaporator constant above the freezing point. The reference value is also adjusted according to the heat load signal from the heat load detecting device 70 to adjust the working rate of the compressor 11.

When the manual setting switches 72 and 73 and the manual switch 83 are turned to the Auto sides, the heat load signal of the heat load detecting device 70 is fed to each of the actuators 26, 36, and 50 as an input voltage Vin so that each control device 27A, 37A, or 34A controls the drive circuit 25A, 35A, or 60A so as to make the output of the position detecting device 26A, 36A, or 50A equal to the heat load signal, thus bringing each shutter to the desired position. At this point, the blower 3 is set at the desired speed corresponding to the desired opening of the air mixing shutter 5 because the air blower controlling device 31A controls the drive circuit 65A according to the position of the actuator 50.

On the other hand, when the manual setting switches 72 and 73 and the manual switch 83 are turned to the Manual side, the actuator 26 is supplied with an input voltage Vin from one of the setting switches 74a–74c of the manual setting device 74 so that the air changing shutter 2 is set at the desired position corresponding to the input signal Vin from the setting switch.

The actuator 36 is supplied with an input voltage Vin from one of the setting switches 78a–78d of the manual setting device 78 to change the operation mode. The air mixing shutter 5 is always controlled by the actuator 50 in accordance with the heat load signal from the heat load detecting device 70, which in turn controls the working rate of the compressor 11.

Figure 5:
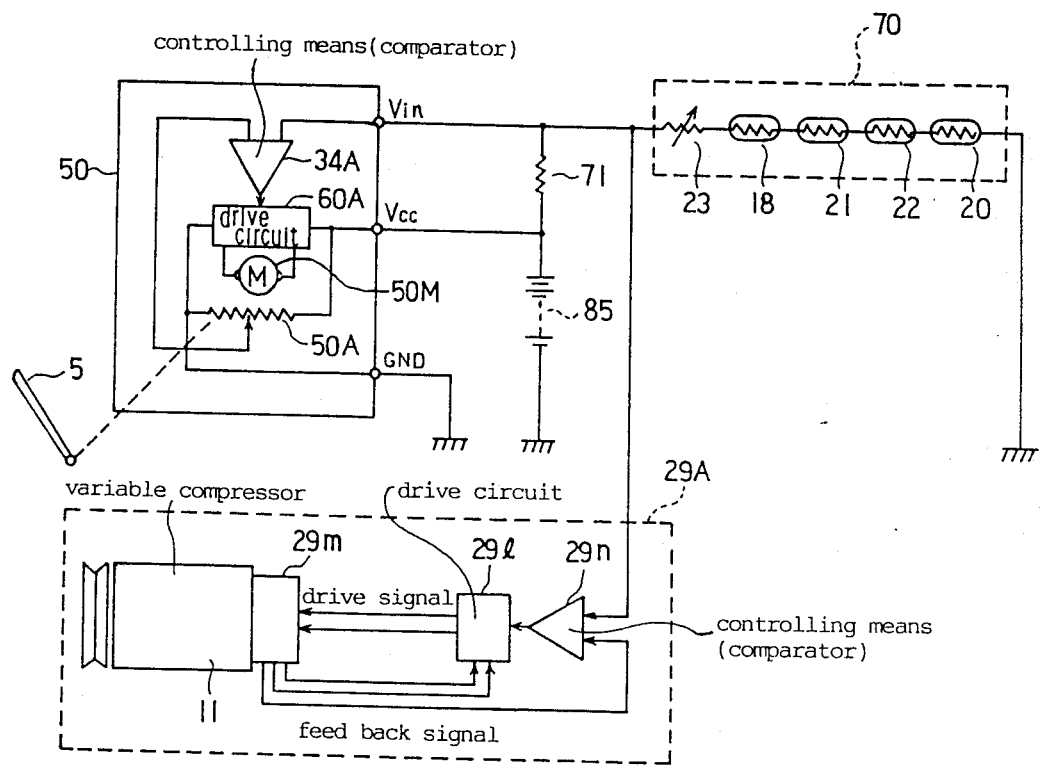
FIG. 5 is a block diagram of another compressor controlling device according to the invention.

FIG. 5 shows an embodiment of the compressor controlling device which determines the capacity of the compressor 11 according to the heat load by means of a controlling device 29n, which controls a drive circuit 29l so as to make the feed back signal equal to the heat load signal from the heat load detecting device 70. The compressor 11 may be of the type whose characteristic is changed obliquely so that the oblique angle of the characteristic is changed by the actuator 29m. Alternatively, the compressor may be of the type having an electromagnetic vlave for controlling the flow rate of a cooling medium flowing into the compressor.

Figure 6:
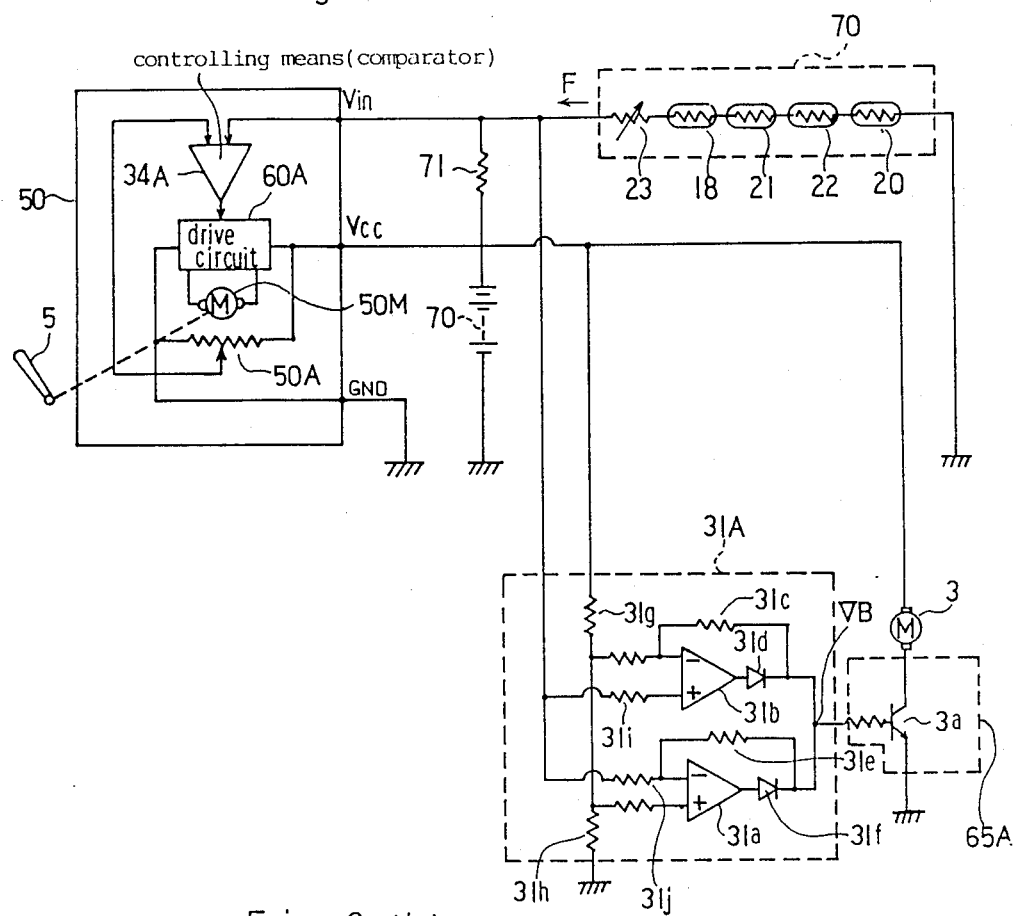
FIG. 6(a) is a block diagram of an embodiment provided with another blower controlling device according to the invention.
FIG. 6(b) a graph showing the voltage change in the form of a inverted trapezoid, which is applied to the blower driving device of FIG. 6(a)
Figure 6:
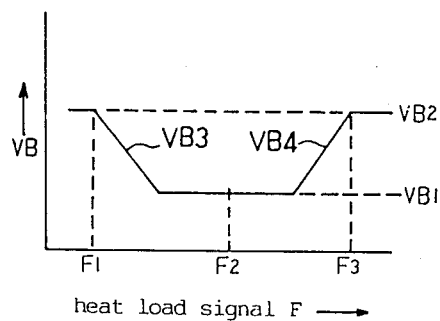

As FIG. 6(a) shows, the blower controlling device 31A is constructed so as to produce a voltage VB based on the heat load signal of a heat load detecting device 70. The voltage VB varies with the heat load signal F in the form of a inverted trapezoid as shown in FIG. 6(b), which drives an amplifying transistor 3a to control the blower 3 along the characteristic curve of the voltage VB. Namely, the blower 3 is operated at a high speed in the full heater mode at heat load signal F1, at a low speed in the bi-level mode at F2, and at a high speed in the full color mode at F3.

The blower controlling device 31A consists of an operational amplifier 31a for producing an output VB3, an operational amplifier 31b for producing an output VB4, a resistor 31c for setting a lower limit VB1, a diode 31d, a resistor 31e for setting an upper limit VB2, and a diode 31f. The reference voltage determined by resistors 31g and 31h is fed to the inversion input of the operational amplifier 31b and the non-inversion input of the operational amplifier 31a and the heat load signal F is fed to the non-inversion input of the operational amplifier 31b and the inversion input of the operational amplifier 31a through resistors 31i and 31j, respectively.

Figure 7:
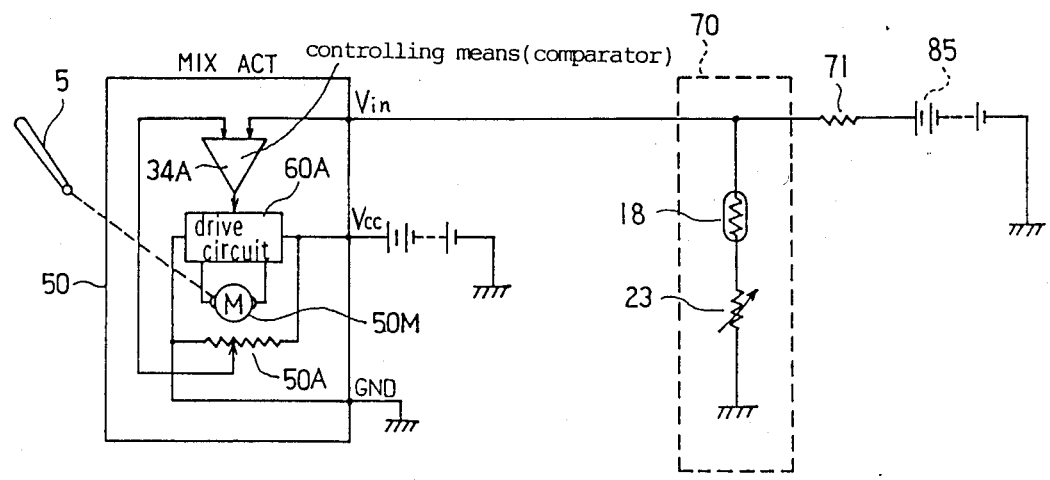
FIG. 7 is a block diagram of another embodiment of the heat load detecting device.

In FIG. 7, the actuator 50 may be supplied with the heat load signal produced by a series circuit of the inside air sensor 18 and the temperature setting device 23.

Figure 8:
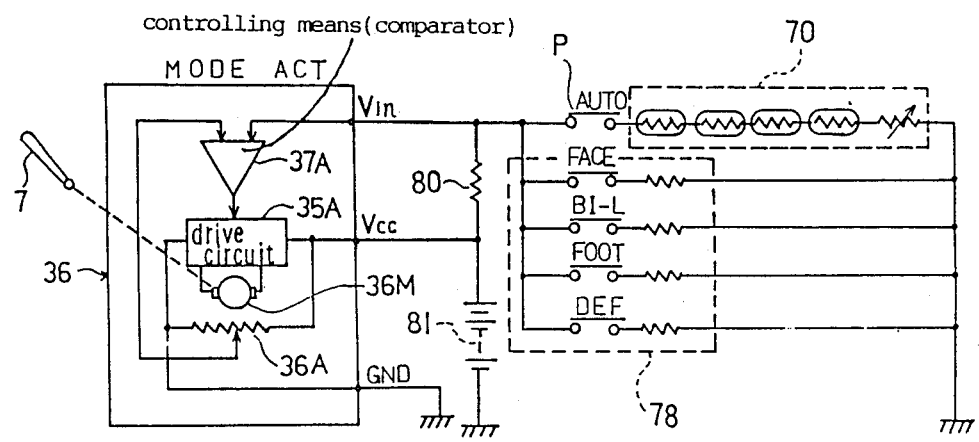
FIGS. 8 and 9 are block diagrams each showing a manual switch unit added to the heat load detecting device.
Figure 9:
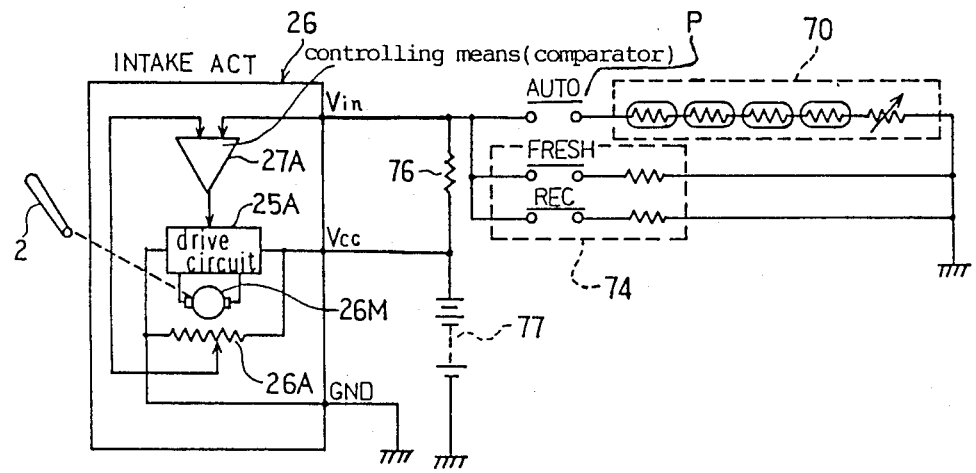

As FIGS. 8 and 9 show, each of the actuators 36 and 26 may be connected to the heat load detecting device 70 through a switch P which is turned on for the automatic control and off for the manual conrol.

According to the invention, it is possible to eliminate the conventional control unit 24 by providing each actuator with a controlling device for driving according to an external signal input thereto.

Another advantage is that when the installed actuator is replaced by a new one, it is not necessary to replace the control unit 24, thus reducing the replacement cost.

Still another advantage is that when one of the actuators becomes out of order, the remaining actuators can operate independently, thus preventing the air-conditioning equipment from stopping all its functions.

Yet another advantage is that the separation of the control signal outputting device from the actuators allows the air-conditioning equipment to have a large degree of freedom in selection of the number of actuators or control lines according to the required functions.

Another advantage is that the structure is simplified by feeding a compressor control unit and the blower control unit with a heat load signal from the heat load detecting device, thus eliminating the necessity that these control devices be mounted within the central control unit as in the prior art.

Alternatively, the above drive circuit and controlling device may be mounted on the outside of the case 26T, 36T, or 50T.

What is claimed is:

1. Air-conditioning equipment for a vehicle comprising:
   a duct mounted within said vehicle for conducting air into a compartment of said vehicle;
   a first shutter mounted at an inlet of said duct to control an outside air/inside air ratio of said air;
   a blower provided within said duct for blowing said air into said vehicle compartment;
   air temperature regulation means including a refrigerant evaporator and a heater mounted within said duct for respectively cooling and heating said air;
   a second shutter mounted within said duct for controlling a mixing ratio of said cooled and heated air;
   a heat load detected device having at least a temperature setting device and a compartment temperature sensor connected together to produce an analog heat load signal;
   first separate shutter control means including a first electric motor for moving said first shutter, a first drive circuit for driving said first electric motor, a first controlling device directly connected to said heat load detecting device to control said first drive circuit to thereby control said first shutter between outside and inside air intake modes in accordance with said heat load signal, and a first housing for encasing said first electric motor, first drive circuit, and first controlling device as a unit;
   second separate shutter control means including a second electric motor for moving said second shutter, a second drive circuit for driving said second electric motor, a second controlling device directly connected to said heat load detecting device to control said second drive circuit to thereby control an opening of said second shutter in accordance with said heat load signal, and a second housing for encasing said second electric motor, second drive circuit, and second controlling device as a unit; and
   blower control means responsive to changes in output of said second shutter control means to change a flow rate of said air from high to low and then low to high when said opening of said second shutter linearly changes.

2. Air conditioning equipment for a vehicle comprising:
   a duct mounted within said vehicle for conducting air into a compartment of said vehicle;
   a first shutter mounted at an inlet of said duct to control an outside air/inside air ratio of said air;
   a blower provided within said duct for blowing said air into said vehicle compartment;
   air temperature regulation means including a refrigerant evaporator and a heater mounted within said duct for respectively cooling and heating said air;
   a second shutter mounted within said duct for controlling a mixing ratio of said cooled and heated air;
   a heat load detecting device having at least a temperature setting device and a compartment temperature sensor connected together to produce an analog heat load signal;
   first separate shutter control means including a first electric motor for moving said first shutter, a first drive circuit for driving said first electric motor, a first controlling device directly connected to said heat load detecting device to switch said first shutter between outside and inside air intake positions in accordance with said heat load signal, and a first housing for encasing said first electric motor, first drive circuit, and first controlling device as a unit;
   second separate shutter control means including a second electric motor for moving said second shutter, a second drive circuit for driving said second electric motor, a second controlling device directly connected to said heat load detecting device to control an opening of said second shutter in accordance with said heat load signal, and a second housing for encasing said second electric motor, second drive circuit, and second controlling device as a unit;
   blower control means responsive to an output of said second shutter control means to change a flow rate of said air from high to low and then low to high when said opening of said second shutter linearly changes;
   a third shutter mounted within said duct for directing a flow of said air between a face side duct and a foot side duct; and
   third separate shutter control means including a third electric motor for moving said third shutter, a third drive circuit for driving said third electric motor, a third controlling device directly connected to said heat load detecting device to set said third shutter in a face side, bi-level, or foot side outlet position, and a third housing for encasing said third electric motor, third drive circuit, and third controlling device as a unit.

* * * * *